United States Patent [19]

Eades et al.

[11] Patent Number: 4,579,659
[45] Date of Patent: Apr. 1, 1986

[54] FILTER NOZZLE

[75] Inventors: Allison W. Eades, Willingboro, N.J.; Mark J. Bogdan, Levittown, Pa.

[73] Assignee: Indreco U.S.A., Ltd., Philadelphia, Pa.

[21] Appl. No.: 548,510

[22] Filed: Nov. 3, 1983

[51] Int. Cl.$^4$ .............................................. B01D 35/28
[52] U.S. Cl. ..................................... 210/541; 210/293
[58] Field of Search ................ 137/550; 210/289, 291, 210/293, 541; 239/600, 601

[56] References Cited

U.S. PATENT DOCUMENTS

| | | | |
|---|---|---|---|
| 1,569,896 | 1/1926 | Tanner | 210/293 |
| 2,412,032 | 12/1946 | Bill | 210/293 |
| 3,081,877 | 3/1963 | Jakobs et al. | 210/293 |
| 3,498,462 | 3/1970 | Larrowe et al. | 210/293 |
| 3,642,205 | 2/1972 | Marty | 210/293 |
| 3,648,731 | 3/1972 | de Boerr | 137/550 |
| 3,954,620 | 5/1976 | Nebolsine | 210/293 |
| 4,084,750 | 4/1978 | Fett | 239/600 |
| 4,435,286 | 3/1984 | Louboutin et al. | 210/293 |
| 4,476,020 | 10/1984 | Cheetham | 210/289 |

Primary Examiner—Ivars Cintins
Attorney, Agent, or Firm—Hopgood, Calimafde, Kalil, Blaustein & Judlowe

[57] ABSTRACT

A preferred form of the invention contemplates a two-piece nozzle construction for use in assembled relation to the tube sheet of an underdrain filter system, wherein each of two nozzle halves is assembled to a tube-sheet opening, solely by access from the downstream side of the tube sheet, and with each of the two halves holding the other in the thus-assembled relationship; in the assembled relationship, the closed upstream end of the upstream half extends a substantial distance into lower bed material of the filter, with flow access to the nozzle via a distributed plurality of relatively small openings in the cylindrical body wall of the upstream half. The downstream half is open at both ends and, in assembled condition, extends downward from the tube sheet; this downstream half has side ports to assure uniform air flow up through the filter bed, in a backwash mode of the filter system.

16 Claims, 12 Drawing Figures

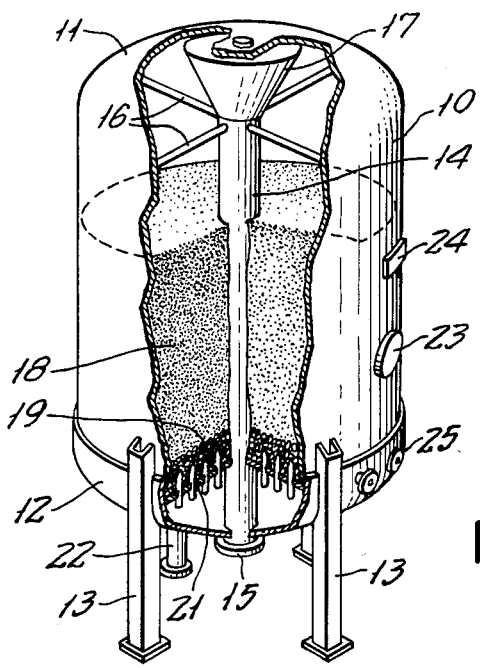
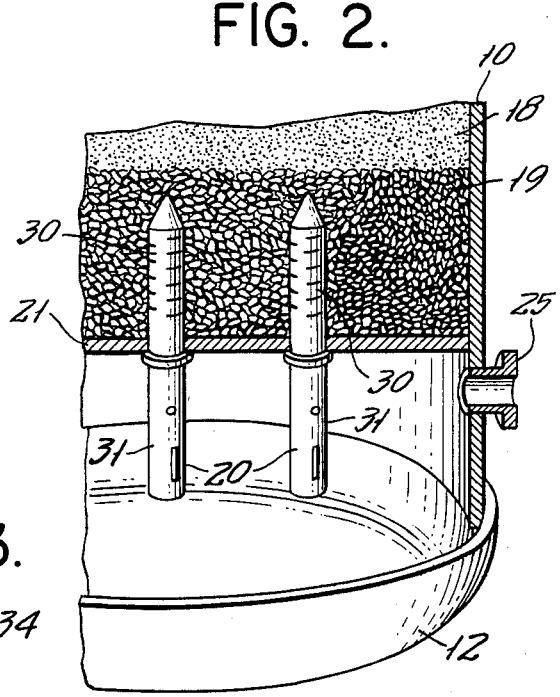
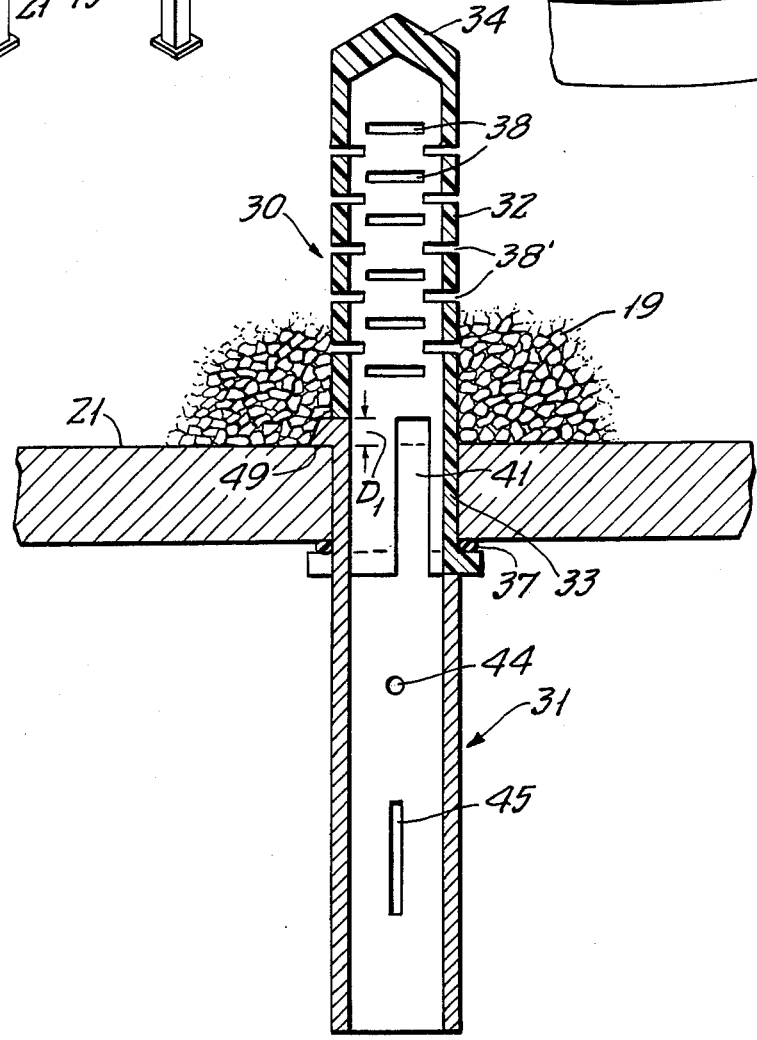

FILTER NOZZLE

BACKGROUND OF THE INVENTION

The invention relates to industrial filtration systems and in particular to an improved nozzle construction for use in multiple in a filtration system, such as a sand-filter underdrain system.

A modern gravity-operated filter construction relies upon a horizontal tube sheet having a plurality of like openings to each of which a tubular plastic nozzle is fitted and retained by snap engagement, upon insertion from below, i.e., from the downstream side of the tube sheet. Each nozzle is open at both ends, and there is thus substantial upwardly open exposure for occasional passage of or clogging by solid matter. To foreclose entry for such passage or clogging, it is customary to employ vertical spacers on the tube sheet whereby a support grid can be positioned at or slightly above the snap-engaged upper ends of the nozzles; the support grid retains a gravel bed free of the upstream ends of the nozzles, and sand, anthracite coal, or other granular media may provide successive beds of filter material carried by the gravel bed.

BRIEF STATEMENT OF THE INVENTION

It is an object of the invention to provide an improved nozzle construction whereby the vertical spacers and support grid of prior devices of the character indicated are not needed.

A specific object is to meet the above object with a construction wherein the entire inlet area of the nozzle can be exposed to filter-bed material, without impairing nozzle function.

Another specific object is to meet the above objects with a construction which is assembled to a tube sheet only from the downstream side of the tube sheet.

A further object is to provide such a nozzle with the capability of being removable with filter media in place.

The invention in a preferred form achieves the above objects with a two-piece nozzle construction for use in assembled relation to the tube sheet of an underdrain filter system, wherein each of two nozzle halves is assembled to a tube-sheet opening, solely by access from the downstream side of the tube sheet, and with each of the two halves holding the other in the thus-assembled relationship; in the assembled relationship, the closed upstream end of the upstream half extends a substantial distance into lower bed material of the filter, with flow access to the nozzle via a distributed plurality of relatively small openings in the cylindrical body wall of the upstream half. The downstream half is open at both ends and, in assembled condition, extends downward from the tube sheet; this downstream half has side ports to assure uniform air flow up through the filter bed, in a backwash mode of the filter system.

DETAILED DESCRIPTION

The invention will be described in detail for a preferred form and for other embodiments, in conjunction with the accompanying drawings, in which:

FIG. 1 is a simplified and partly broken-away perspective view of an underdrain filter system to which nozzles of the invention have been assembled;

FIG. 2 is an enlarged fragmentary view of part of the nozzle-supported region of the filter system of FIG. 1;

FIG. 3 is a further enlarged view in vertical section, to show a single nozzle in the system of FIGS. 1 and 2;

Figure 4:
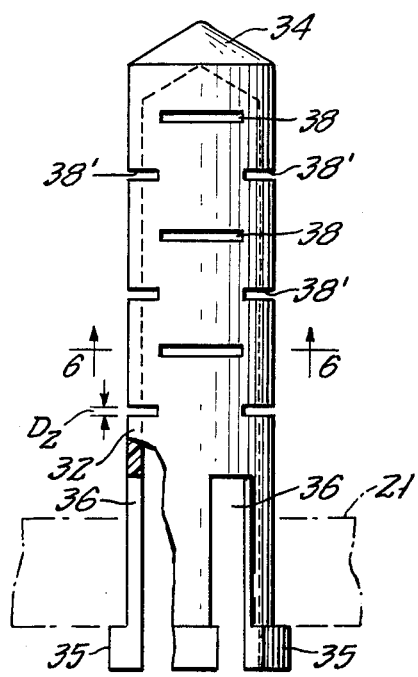
FIG. 4 is a view in side elevation of a first part of the nozzle of FIG. 3.
Figure 5:
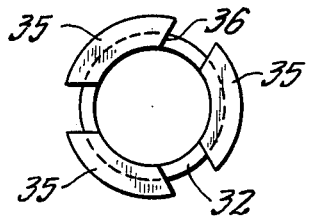
FIG. 5 is a bottom-end view of the nozzle part of FIG. 4.
Figure 6:
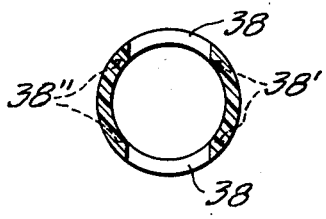
FIG. 6 is a sectional view, taken at 6—6 in FIG. 4.

In FIGS. 1 and 2, the invention is shown in application to an underdrain filter system comprising an upstanding cylindrical wall 10 with upper and lower end-bell closures 11-12, and equipped with legs 13 for mounting at serviceable vertical offset above a floor slab or the like. A central tubular column 14 has a filter-inlet connection 15 at its lower end, and the upper end of column 14 is stabilized by radial struts 16 and terminates within end bell 11 at an outwardly flared distributor 17 of inlet liquid to be filtered. Liquid entering the volume between column 14 and wall 10 is subjected to gravity filter action through successive beds 18-19 of filter materials, before passing through nozzles 20 mounted to a tube sheet 21 in vertically spaced relation above end bell 12. Filtered liquid discharged from nozzles 20 is discharged from end bell 12 via an outlet connection 22. A removable manhole cover 23 and a removable top-fill cover 24, respectively, provide side access for grading a gravel bed at 19 and a sand or other upper-medium bed 18; similarly, a removable manhole cover (not shown) in end bell 12 will be understood to provide servicing access to the downstream (i.e., lower) side of tube sheet 21. Means including an air inlet 25 and a vent 26 will be understood to serve customary external connections (not shown) for backwash and the like operation and maintenance purposes.

Referring now to FIGS. 3 to 8, each of the nozzles 20 mounted to tube sheet 21 comprises upper and lower parts which will be referred to as halves 30 (FIGS. 4 to 6) and 31 (FIGS. 7 and 8), respectively. These halves 30-31 each have plural fingers or splines which mesh in angular interlace and which have flange or lug formations to so engage opposite sides of the tube sheet 21 as to lock themselves to each other and to the tube sheet.

More specifically, the upper half 30 of nozzle 20 is preferably an injection-molded integrally formed unit of suitable plastic such as general-purpose polypropylene; unit 30 is characterized by an elongate tubular body 32 of external diameter to fit one of the apertures 33 of tube sheet 21. The upper end 34 of body 32 is closed and conically configured*, and the lower end is open and characterized by radially outward flange or lug formations 35, between longitudinal slots 36. The flange formations 35 establish an upper limit to the extent by which nozzle half 30 can be upwardly inserted through the tube-sheet aperture 33, being preferably in resilient sealing engagement with the lower or downstream surface of the tube sheet, as via an elastomeric O-ring 37.

When nozzle half 30 is thus seated to the lower surface of tube sheet 21, the upper end of slots 36 is at offset $D_1$ above the upper or upstream surface of the tube sheet. Finally, the exposed tubular body 32 (i.e., above the tube sheet) is characterized by a distributed plurality of relatively small openings having a total effective flow-opening area which is preferably equal to or greater than the internal section area within tubular body 32. As shown, to provide such openings, first pairs of opposed angular slots 38 of narrow axial extent $D_2$ at first axial location are in angularly interlaced and axially interlaced relation with second pairs of opposed similar slots 38'. In a typical situation, the slot width $D_2$ is 3/32-inch, and the gravel size for the bed 19 in which nozzle half 30 is immersed is ¼-inch, i.e., such as to pass through a screen of ¼-inch mesh.

Figure 4A:
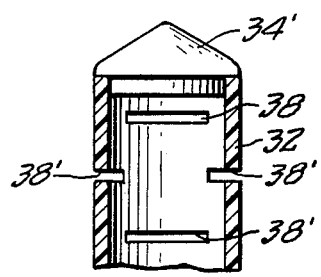
FIG. 4A is a fragmentary view to show modification of the upper end of the nozzle part of FIG. 4.
Figure 8:
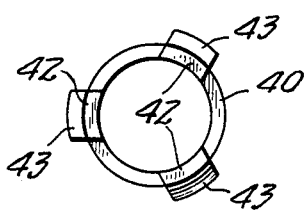
FIG. 8 is a top-end view of the nozzle part of FIG. 7.
Figure 7:
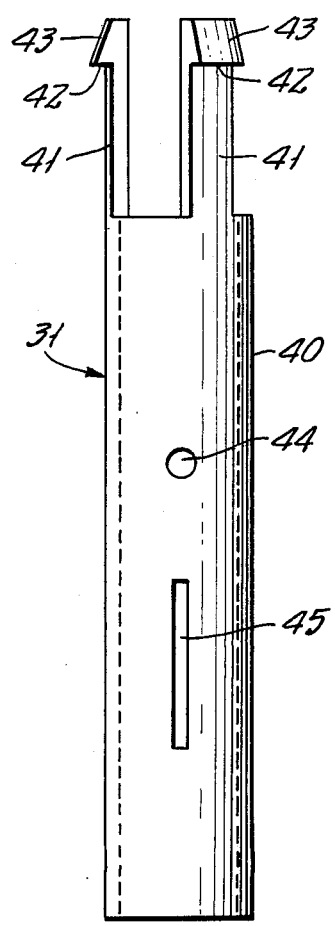
FIG. 7 is a view similar to FIG. 4 for a second part of the nozzle of FIG. 3.

*As seen in FIG. 4A, a conical plug 34' fitted to the bore of an otherwise purely tubular body 32 will serve substantially the same purposes as the integrally closed arrangement of FIGS. 3 and 4.

The lower half 31 of nozzle 20 is also preferably an integrally formed unit, injection-molded of suitable plastic (e.g., polypropylene) and is characterized by an elongate tubular body 40 of internal and external diameters to match those of upper body 32. Body 40 is open at both ends, and its upper end is configured with elongate finger or spline formations 41 to match the number and spacing of slots 36 in upper body 32. Further, the effective angular width and axial extent of finger formations 41 are such as to establish closeclearance relation with the slot walls in which they are receivable, the effective passage area of such clearance relations being small, i.e., less than the width dimension $D_2$ of any of slots 38—38'. The upper ends of fingers 41 have integrally formed radially outward lugs 42 for snap-lock engagement to the upper surface of tube sheet 21, it being understood that each such lug 42 is at the cantilevered end of a stiffly compliant finger 41. A cam-wedge profile 43 at the upper end of each lug 42 will be understood to inwardly cam fingers 41 upon insertion from beneath the tube sheet, with snap-lock engagement to the tube sheet once lugs 42 clear the upper surface of the tube sheet. At this juncture, the upper body half 30 is engaged to the lower surface of the tube sheet, the lower body half 31 is engaged to the upper surface of the tube sheet, and the mutual abutment of bodies 30-31 resiliently loads the O-ring seal 37 in compression. Description of the lower half of nozzle 20 is completed by identifying a single orifice 44 in body 40 at an axial location which is ultimately beneath the elevation of air inlet 25 (see FIG. 2), and by identifying a single elongate slot 45 beneath orifice 44. The orifice 44 provides air distribution to each of the plural nozzles 20 on tube sheet 21, ensuring uniform air flow up through each nozzle and through the filter beds, during a backwash or filter-scrubbing mode of the apparatus; the slot 45 provides for an even flow of air in the event that excess air is charged into the system in the course of backwashing.

It has been explained that installation of described two-piece nozzles is a straightforward simple operation wherein the parts 30-31 are each introduced, in that order, through a tube-sheet aperture 33, and snap-locked in place. Removal is also simple, involving destruction and discard of a used lower half 31, thus freeing the upper half 30 for downward removal, so that it may be inspected, cleaned and reinserted for further service, a new lower half 31 being used to secure the inspected and cleaned upper half 30 in place. In the course of such removal for servicing, the bed 19 remains undisturbed, thus facilitating reinsertion for extended service. The discard of the used lower half 31 is of little economic concern, since it is an inexpensive simple part; on the other hand, the more complex and expensive upper half 30 is reinstalled for extended service.

Figure 9:
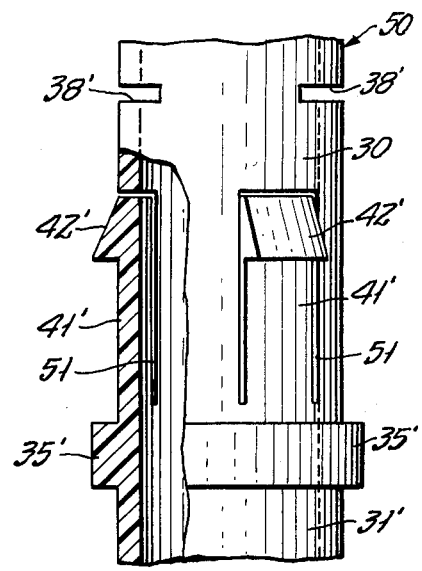
FIG. 9 is a fragmentary view in side elevation to show a nozzle modified with respect to the nozzle of FIG. 3.

FIG. 9 is a fragmentary diagram to show that, if desired, described nozzle features may be obtained in a single-piece injection-molded plastic part 50 wherein upper and lower halves 30'-31' of the single part have the same elongate tubular body, with an integrally formed circumferential flange 35' for locating engagement, via O-ring 37, against the underside of tube sheet 21. Insertion through tube-sheet opening 33 is again upward, from beneath the tube sheet, and snap-lock engagement to the upper surface of the tube sheet is via locking lugs 42' on compliant fingers 41' integrally formed with the tubular body; an inverted U-shaped slit 51 in the tubular body will be understood to define each integrally formed locking finger 41'. The embodiment of FIG. 9 provides an improved arrangement for assuring integrity of the O-ring seal engagement at 37, but it is not preferred because it is relatively costly and must be destroyed and replaced by another nozzle in order to remove the used nozzle.

Figure 10:
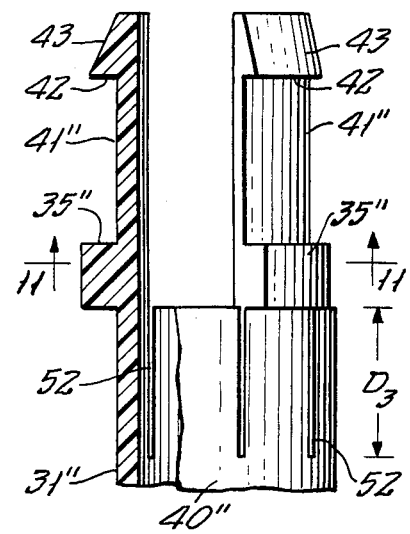
FIG. 10 is a fragmentary view in side elevation to show a modification of the nozzle part of FIG. 7.
Figure 11:
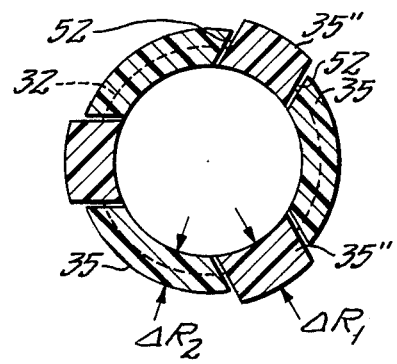
FIG. 11 is a sectional view, taken at 11—11 in FIG. 4 and at 11—11 in FIG. 10, to show the assembled relation of the parts of FIGS. 4 and 10.

In the arrangement of FIG. 10, finger formations 41" at the upper end of a lower half nozzle 31" are of greater axial extent than in the embodiments of FIGS. 3 to 9, being made longer by reason of slits 52 extending downward into tubular body 40", to an extent $D_3$ below the lower plane of flange lugs 35" which are integral radially outward features of fingers 41". As seen in FIG. 11, the effective radial thickness $\Delta R_1$ of flange lugs 35" exceeds the effective radial thickness $\Delta R_2$ of the flange segments 35 between slots 36 of the upper nozzle half 30 (FIG. 4), and the axial extent and secured location of upper and lower surfaces of flange lugs 35" coincide with (i.e., are in essentially the same axial plane as upper and lower surfaces of flange segments 35), when the nozzle halves of FIGS. 4 and 10 are secured to the same tube-sheet aperture 33; this relationship will be seen to assure more complete circumferential continuity of O-ring (37) loading, in a mounted condition of the nozzle. Further, the slits 52 are in pairs which effectively extend the cantilevered extent of fingers 41", so that radial compression of flange lugs 35" may be effective to dislodge a mounted nozzle, without destroying the lower half 31" (FIG. 10). Further, the fact of $\Delta R_1$ being greater than $\Delta R_2$ to a sufficient extent will be seen to enable application of a so-called Breeze clamp over the radially prominent profiles of all flange lugs 35", so that by circumferentially reducing the clamp, all flange lugs 35" are transiently displaced inwardly as all fingers 41" are caused to compliantly deflect, thus eventually and without destruction dislodging the engaged relation of lugs 42 from the upper surface of the tube sheet.

It will be seen that the described embodiments of the invention meet all stated objectives and lend themselves to replacement in existing filter structures while at the same time making it possible to discard and not replace used spacers and support grids of the existing structures. Also, once installed in a given filter-bed environment having no spacers or support grids, servicing, inspection, cleaning and reinstallation are all possible via downstream access and without disturbing the filter-bed environment. Existing features of the filter system for backwashing and other functions remain as before.

While the invention has been described in detail for various embodiments, it will be understood that modifications may be made without departure from the scope of the invention.

What is claimed is:

1. As an article of manufacture, a two-piece nozzle adapted for installation at a circular aperture of a tube sheet and installable solely from the downstream side of the tube sheet; the first or upstream piece comprising a first elongate tubular body with a closed upstream end and an open downstream end and of diameter adapted for aperture insertion through and substantial extension beyond the tube sheet, said first piece being characterized by (1) a radially outward flange at its downstream end for limiting the extent of first-piece insertion via the tube-sheet aperture, (2) a distributed plurality of relatively small openings in that part of said body which extends beyond the tube sheet when in flange-limited relation to the tube sheet, and (3) at least one longitudinal slot of limited angular extent open through the downstream end of said body and extending longitudinally upstream from said flange to a limited extent which exceeds the tube-sheet thickness; the second or downstream piece comprising an elongate tubular second body open at both ends and of substantially first-body diameter, the upstream end of said second body being characterized by (4) an arcuate circumferential surface adapted to axially engage the downstream end of said first body, and (5) at least one longitudinally extending compliant finger sized to enter said slot, said finger having a radially outward snap-lock lug formation at such longitudinal offset from said arcuate surface as to snap-engage to the upstream side of the tube sheet.

2. The article of claim 1, in which said slot is one of a plurality of angularly spaced slots, and said finger is one of a corresponding plurality of angularly spaced fingers enterable in the respective slots.

3. The article of claim 2, in which the plurality of said slots is three and the plurality of said fingers is three.

4. The article of claim 1, in which the axial extent and effective angular width of said finger substantially match the corresponding dimensions of the slot, whereby said distributed plurality of relatively small openings account for substantially the entire filter flow through said article when tube-sheet mounted.

5. The article of claim 1, in which said first piece is an integrally formed single injection-molded plastic part.

6. The article of claim 1, in which said second piece is an integrally formed single injection-molded plastic part.

7. The article of claim 1, in which said relatively small openings comprise a series of axially spaced pairs of slot formations of relatively small axial extent and relatively great angular extent.

8. The article of claim 7, in which the slot formations of one pair are in angularly interlaced relation with the slot formations of an axially adjacent pair.

9. The article of claim 1, in which the closed upstream end of said first piece is generally conically tapered in the upstream direction.

10. The article of claim 9, in which the upstream end of said first tubular body is closed by a plug having said generally conical taper.

11. The article of claim 1, in which longitudinal slit formations aligned with lateral walls of said finger extend into the upper end of said second piece, whereby finger deflecting access is afforded below the plane of the flange engagement to the underside of the tube sheet.

12. As an article of manufacture, a two-piece nozzle adapted for installation at a circular aperture of a tube sheet and installable solely from the downstream side of the tube sheet; the first or upstream piece comprising a first elongate tubular body with a closed upstream end and an open downstream end and of diameter adapted for aperture insertion through and substantial extension beyond the tube sheet, said first piece being characterized by a distributed plurality of relatively small openings in that part of said body which extends beyond the tube sheet while at least a small portion of the downstream end of said first piece is still offset downstream from the downstream side of the tube sheet; the second or downstream piece comprising an elongate tubular second body open at both ends and of substantially first-body diameter, the upstream end of said second piece being at least in part adapted for axially limiting abutment with at least part of the downstream end of said first piece; and angularly interlaced longitudinal fingers on the downstream end of said first piece and on the upstream end of said second piece, the fingers of said first piece having radially outward lug formations for axially limiting relation with the downstream side of the tube sheet, and the fingers of said second piece having having radially outward lug formations for axially limiting relation with the upstream side of the tube sheet when said pieces are in axially limiting abutment with each other.

13. The article of claim 12, in which the fingers of each piece are in a plurality of three, at equal angular spacing.

14. As an article of manufacture, an elongate tubular nozzle adapted for installation at a circular aperture of a tube sheet and installable solely from the downstream side of the tube sheet, said nozzle having radially outward flange means at a location intermediate a closed upper end and an open lower end, said location being such as to expose a substantial length of nozzle tubing at a first region between the closed end and a tube-sheet engaging region adjacent the flange, and such as to expose a substantial length of nozzle tubing at a second region below the flange, the nozzle tubing of said first region being characterized by a distributed plurality of relatively small openings, and an integrally formed elongate stiffly compliant finger formed out of said tubing in the tube-sheet-engaging region and having a cantilevered upper end, said finger being characterized by a radially outward locking lug at the cantilevered upper end of said finger and poised for snap-engagement with the upper surface of the tube sheet when the flange is referenced to the lower surface of the tube sheet.

15. The article of claim 14, in which said nozzle regions are integral components of the same single piece.

16. The article of claim 14, in which said first and second nozzle regions are respectively integral parts of separate nozzle halves, the flange being an integral formation with the first region, and the locking lug and finger being an integral formation with the second region.

* * * * *